UNITED STATES PATENT OFFICE.

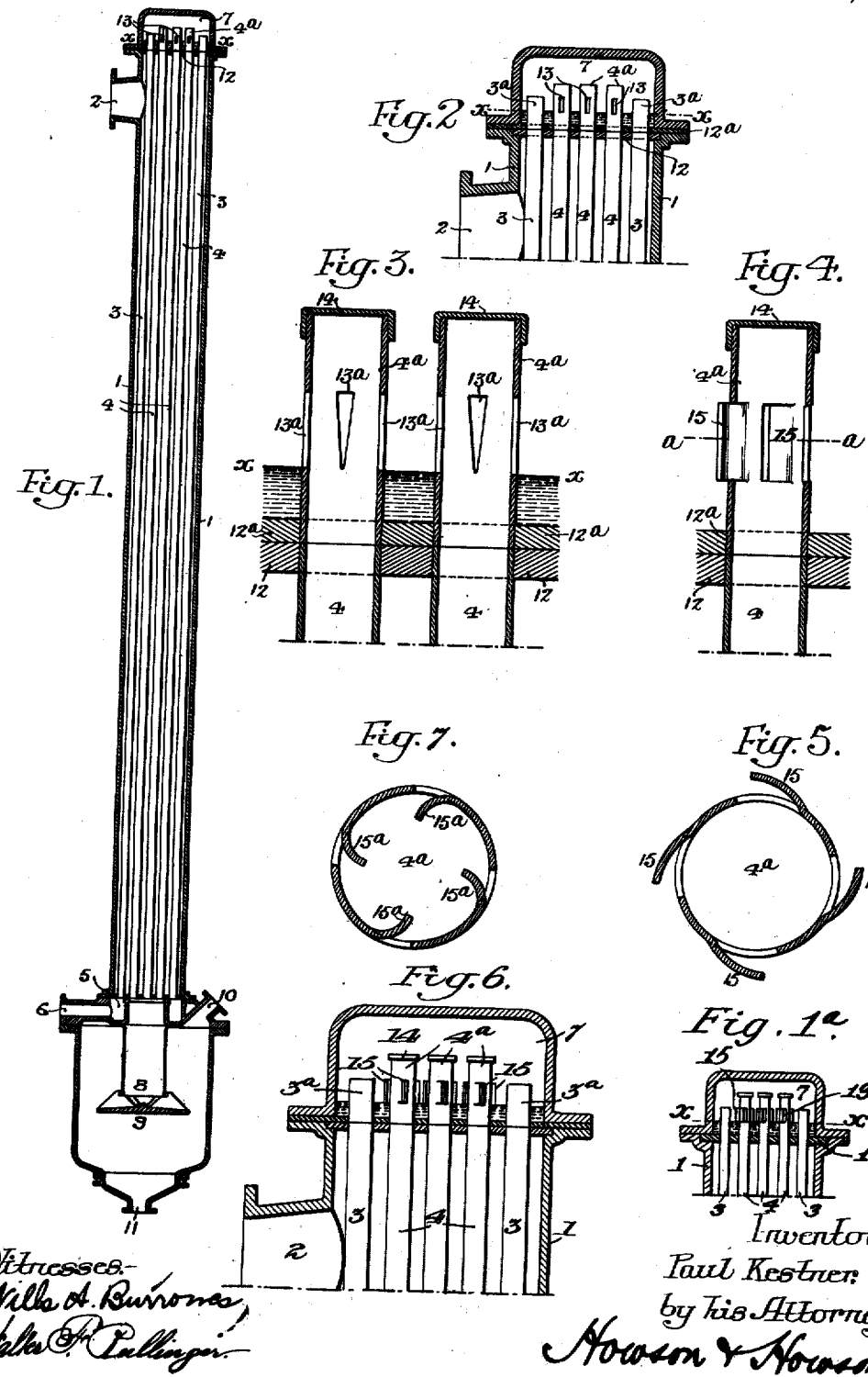

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

EVAPORATING APPARATUS.

1,005,553.   Specification of Letters Patent.   Patented Oct. 10, 1911.

Application filed March 27, 1909. Serial No. 486,105.

*To all whom it may concern:*

Be it known that I, PAUL KESTNER, a citizen of the Republic of France, and a resident of Lille, Department of Nord, France, have invented certain Improvements in Evaporating Apparatus, of which the following is a specification.

My invention relates to evaporating apparatus, and consists of improvements in connection with apparatus for concentrating liquids of the type of that disclosed in my Patent No. 965,822, July 26, 1910 in which the liquid is concentrated by passage successively in an upward and downward direction through externally heated tubes mounted within a suitable shell to which steam is applied. In the operation of such a form of evaporating apparatus, the liquid is caused to descend in certain of the tubes, by gravitation and the impelling force of the vapor generated in the tubes in which the liquid ascends, and such vapor causes the liquid to completely and uniformly wet the walls of the tubes in which it descends thus giving a good film at all points and assisting the flow of the liquid in order that it shall not form separate currents as liquid flowing under gravitation is apt to do. In passing upward through the ascending tubes much vapor is formed and this with partly concentrated liquor is discharged at the tops of said tubes. It is desirable that the rising body of liquid in overflowing to the descending tubes shall pass downward in a continuous film in order to give a high efficiency in evaporation. To this end, I provide means at the tops of the descending tubes serving to distribute liquid and vapor to said tubes uniformly and in such manner as to secure the highest efficiency in concentration.

My invention is fully shown in the accompanying drawings, in which:

Figure 1, is a sectional elevation of one effect of an evaporating apparatus of the type to which my invention has been applied; Fig. 1ª is an enlarged sectional view of one embodiment of my invention; Fig. 2, is an enlarged sectional view of the upper end of the apparatus, shown in Fig. 1; Fig. 3, is an enlarged view of the tops of the tubes in which liquid descends, illustrating another construction embodying my invention; Fig. 4, is an enlarged view illustrating another form of liquid distributing means; Fig. 5, a sectional view on the line *a—a*, Fig. 4; Fig. 6, is a view similar to Fig. 2 illustrating the use of the form of structure shown in Fig. 5, and Fig. 7, is a sectional view of the same character as Fig. 5, illustrating a modified form of my invention.

Briefly speaking, evaporators of the type to which the present invention is particularly applicable consist of a shell into which steam or other heating medium may be admitted at 2. Within the shell 1 are two sets of vertical, or substantially vertical tubes indicated at 3 and 4, through which the liquid to be concentrated travels. The direction of travel in the tubes 3 is upward, while the partly concentrated liquid and the vapor produced in its ascent in said tubes 3, descends in the tubes 4, assisted by said vapor; the progress of travel through both sets of tubes being very rapid and effecting a high degree of concentration.

The tubes 3 communicate with an annular inlet chamber 5, fed at 6, at the bottom of the shell 1, and with a chamber 7 at the top of said shell 1, while the tubes 4 extend from said chamber 7 downwardly to a suitable separator 8 arranged in a chamber 9 at the bottom of the evaporator and designed to separate vapor from the descending liquid, vapor escaping at 10, while the separated liquid may be drawn off at 11. In this second phase of the concentrating process, that is to say during the concentration which takes place during descent of the liquid in tubes 4, it is of utmost importance that the liquid should be well and uniformly distributed upon the whole inner surfaces of said tubes 4 in which it descends and that each of these tubes should receive the same amount of liquid. To effect this in the present invention the tubes 4 in which the liquid is to descend may be extended or have extensions above the tube plate or sheet 12 which forms the bottom of the chamber 7 as shown in Fig. 1ª, and have in these extensions, one or more vertical slots 13 of suitable contour. The lower edge of each of these slots is a short distance above the tube plate; the distance being the same for every tube, so that liquid will feed equally into each tube. Each tube 4 may have the same number of slots and these are, by preference, of exactly the same width. The tubes 3 in which the liquid ascends may also be extended a short length above the tube plate 12 but need not be slotted. I prefer, however, to place the ends of the tubes 3 and 4, flush with the top of the tube plate 12, and to provide a supplemental tube plate 12ª which carries extensions 3ª and 4ª, of the tubes 3 and 4. This plate should have the extensions in such position that they will exactly register with said tubes 3 and 4, and packing may be provided to insure against leakage between said tube plates. Among the advantages of the supplemental tube plate with the extensions may be noted the ease with which said plate can be removed if clogging or any other accident occurs to the tubes in order to have the upper ends of the evaporating tubes exposed.

Under operating conditions the liquid and steam coming from the tubes 3 enter the chamber 7 and are thrown with considerable velocity against the cover of said chamber; the liquid then falling on the tube plate forming the bottom of said chamber. As such liquid can escape only by the slots 13 for the descent in the tubes 4, a level will be formed as shown at $x$, and as all the slots would be, as has been stated, exactly on the same level, each will take the same quantity of liquid. The liquid will thus be equally distributed among the several tubes, and, if there are several slots in each tube, will be uniformly distributed over the inner surface of each tube; the vapor simultaneously passing inward and aiding the regular distribution of the liquid over the inner surfaces and insuring an even flow of the liquid thereon. In Fig. 3, is shown a form of this distribution arrangement in which the tubes 4 for the descending liquid are closed at the top by caps 14. In this case it is not only the liquid which passes through the side openings of the tubes, but also the vapor accompanying the same from the tubes 3 in which liquid ascends. It is best that the openings 13 in the tubes 4 shall have a total area about equal to the area of the tubes 3 in which the liquid ascends. These openings indicated at 13ª, are preferably made of the shape shown in Fig. 3, being wider at the top than at the bottom as indicated at 13ª so as to provide ample space for the vapor. The volume of vapor is greater than the volume of the accompanying partly concentrated liquor and it is advantageous to have the width of each opening less at the bottom as giving a better proportioning of the liquid among the several tubes while not giving a too narrow passage for vapor. A substantially V-shaped slot has the further advantage that a temporary excess of liquid is quickly removed, bringing the liquid back to normal level. The arrangement of the structure shown in Fig. 3 with the capped tubes has the additional advantage in that the liquid which is projected with a certain force out of the ascending tubes into the chamber 7 cannot, as it otherwise would, tend to fall bodily into some of the tubes 4 in which the liquid descends, to the detriment of the supply to the others.

In Figs. 4, 5, and 6, I have shown another form of apertured tube in which, in forming the opening, the metal is not entirely cut away but is bent externally to form vanes or wings 15. This arrangement has the effect of causing the vapor and liquid to enter tangentially and therefore produces a whirling motion of the liquid on the inner tube wall which results in very perfect distribution thereof before the downward flowing commences.

In Fig. 7, I have shown a modification of the structure shown in Figs. 4 and 5, in which the metal is bent inwardly to form inner vanes or wings 15ª; such arrangement having substantially the same effect upon the entering vapor and liquid as that shown in Figs. 4 and 5.

Liquid running naturally down the interior of a heated tube tends to flow as drops and distinct or discrete streams. By providing an accompanying current of vapor the flow is forced and the liquid is made to uniformly and thoroughly wet the interior walls of the tubes; its flow being also accelerated. In the structure of the present invention, the evaporating tubes which discharge into the feed chamber at the top of the apparatus furnish both liquid and vapor, and, under the present invention, this vapor with the distributing means, causes a good and uniform flow of liquid downwardly through the heated tubes. With this structure, it is not necessary to add vapor from another source to cause the downward propulsion in the down tubes, as the apparatus in the up tubes itself furnishes both the liquid and the necessary vapor for performing the downward film evaporation.

In my improved construction, the slots and vanes may be formed in the ends of the pipes projecting through the upper tube plate 12, as shown in Fig. 1ª, or they may be formed in the separate sections carried by the plate 12ª above said upper tube plate and registering with the tubes disposed in the casing 1, as shown in Figs. 2 and 6; the effect being the same in either instance. In certain of the claims I have referred to the construction in which the tubes extend above the tube sheet into the chamber 7 as well as to the construction which includes the separate extensions, as "tubular elements"; this term being thought to be broad enough to cover both constructions.

I claim:—

1. The combination in an evaporator of the vertical tube type, of a chamber; means for supplying the chamber with fluid and vapor; a tube projecting into the said chamber from the bottom, the upper end of the tube being slotted so as to simultaneously receive liquid and vapor from said chamber; and means for heating the tube.

2. The combination in an evaporator of the vertical tube type of a receiving chamber for liquid to be evaporated; a second chamber for the reception of concentrated liquid; two series of conduits connecting said chambers; means for heating the conduits; a third chamber interposed between and connecting said two series of conduits; the conduits between the third and second chambers having lateral openings placed to receive liquid and vapor simultaneously from said third chamber.

3. The combination in an evaporator of two chambers respectively for liquid to be evaporated and for concentrated liquid; a plurality of straight, vertical tubes extending from one chamber through the bottom of the other and each having lateral openings into said latter chamber, said tubes forming the sole communication between said chambers; means for heating those portions of the tubes outside of the chambers, the lateral openings of the tubes communicating both with the liquid and with the vapor spaces of the chamber for liquid to be evaporated.

4. The combination in a tubular evaporator of a chamber; means for feeding vapor and liquid to said chamber; straight vertical tubes extending into the chamber and having lateral openings placed to admit liquid and vapor into them; means outside of the chamber for heating the tubes; and a chamber for concentrated liquid connected to receive the latter after it has been treated in said tubes.

5. In a vertical tube evaporator, the combination of two sets of tubes, one for the ascent of liquid and the other for the descent of the same; means for heating said tubes; a chamber communicating with both sets of tubes and receiving the ascending bodies of liquid; and slotted extensions within said chamber and carried by the tubes in which the liquid descends for effecting an even feed and distribution of the liquid thereto and therein.

6. In a vertical tube evaporator, the combination of two sets of tubes, one for the ascent of liquid and the other for the descent of the same; means for heating said tubes; a chamber communicating with both sets of tubes and receiving the ascending bodies of liquid; a tube sheet at the top of said tubes; and a supplemental plate carrying slotted extensions for the tubes in which the liquid descends for effecting an even feed and distribution of the liquid thereto and therein.

7. In a vertical tube evaporator, the combination of two sets of tubular elements, one for the ascent of liquid and the other for the descent of the same; means for heating the tubular elements; a chamber receiving the ascending bodies of liquid, said chamber communicating with the tubular elements in which said liquid descends; means for effecting an even feed of said liquid to the tubular elements in which it descends; and vanes or blades carried by said tubular elements for giving the entering liquid a whirling motion.

8. In a vertical tube evaporator, the combination of two sets of tubes, one for the ascent of liquid and the other for the descent of the same; means for heating the tubes; a chamber receiving the ascending bodies of liquid, said chamber communicating with the tubes in which said liquid descends; a tube sheet at the top of said tubes; a supplemental plate; means carried thereby and registering with the tubes for effecting an even feed of said liquid to the tubes in which it descends; and vanes or blades carried by said means for giving the entering liquid a whirling motion.

9. In a vertical tube evaporator, the combination of two sets of tubes, one for the ascent of liquid and the other for the descent of the same; means for heating the tubes; a chamber communicating with both sets of tubes and receiving the ascending bodies of liquid; slotted tubular extensions carried by the tubes in which the liquid descends for effecting an even feed and distribution of the liquid thereto and therein; and closures for said extensions.

10. In a vertical tube evaporator, the combination of two sets of tubes, one for the ascent of liquid and the other for the descent of the same; means for heating the tubes; a chamber communicating with both sets of tubes and receiving the ascending bodies of liquid; a tube sheet at the top of said tubes; a supplemental plate; slotted tubular extensions carried by said plate and registering with the tubes in which the liquid descends for effecting an even feed and distribution of the liquid thereto and therein; and closures for said extensions.

11. In a vertical tube evaporator, the combination of two sets of tubes, one for the ascent of liquid and the other for the descent of the same; means for heating the tubes; a chamber communicating with both sets of tubes and receiving the ascending bodies of liquid; slotted tubular extensions carried by the tubes in which the liquid descends for effecting an even feed and distribution of the liquid therein; the lower edges of the slots being on the same level; closures for said extensions, and vanes extending tangentially from the tubular extensions adjacent the slots and serving to give a whirling motion to the entering liquid and vapor.

12. In a vertical tube evaporator, the combination of two sets of tubes, one for the ascent of liquid and the other for the descent of the same; means for heating the tubes; a chamber communicating with both sets of tubes and receiving the ascending bodies of liquid; a tube sheet at the top of said tubes; a supplemental plate; slotted tubular extensions carried by said plate and registering with the tubes in which the liquid descends for effecting an even feed and distribution of the liquid thereto and therein; the lower edges of said slots being on the same level; closures for said extensions; and vanes extending tangentially from the tubular extensions adjacent the slots of the same and serving to give a whirling motion to the entering liquid and vapor.

13. In a vertical tube evaporator, the combination of a set of tubular elements for the descent of liquid undergoing concentration; means for heating the same; a chamber communicating with the tubular elements in which said liquid descends; the upper ends of said tubular elements extending into said chamber and being slotted to effect an even and simultaneous feed and distribution of liquid; and means for supplying liquid and vapor to said chamber.

14. In a vertical tube evaporator, the combination of a set of tubular elements for the descent of liquid undergoing concentration; means for heating the same; a chamber communicating with said tubular elements; a tube sheet at the top of said elements; a supplemental tube plate carrying slotted extensions for said tubular elements; said slots serving to effect an even and simultaneous feed and distribution of liquid to said tubular elements; and means for supplying liquid and vapor to said chamber.

15. In a vertical tube evaporator, the combination of two sets of tubular elements; one for the ascent of liquid and the other for the descent of the same; means for heating the tubular elements; a chamber communicating with both sets of tubular elements and receiving the ascending bodies of liquid and vapor, the upper ends of said tubular elements extending into said chamber and the tubular elements in which the liquid descends being slotted for the purpose of effecting an even and simultaneous feed and distribution of liquid thereto; and means for supplying liquid to the apparatus.

16. In a vertical tube evaporator, the combination of two sets of tubular elements, one for the ascent of liquid and the other for the descent of the same; means for heating the tubular elements; a chamber communicating with both sets of tubular elements and receiving the ascending bodies of liquid, the upper ends of said tubular elements extending into said chamber and the tubular elements in which the liquid and vapor descends being slotted for the purpose of effecting an even and simultaneous feed and distribution of liquid thereto; closures for the upper ends of said descending tubular elements; and means for supplying liquid and vapor to the tubular elements for the ascent of liquid.

17. In a vertical tube evaporator, the combination of a set of tubular elements for the descent of liquid undergoing concentration; means for heating the same; a chamber communicating with the tubular elements in which said liquid descends; the upper ends of said tubular elements extending into said chamber and being slotted for the purpose of effecting an even and simultaneous feed and distribution of liquid thereto; vanes extending substantially tangentially from the surface of the tubular elements adjacent the slots of the same and serving to give a whirling motion to the entering liquid and vapor; and means for supplying liquid and vapor to said chamber.

18. A vertical tube evaporator comprising two sets of substantially vertical evaporating tubes; means for heating such tubes; means for supplying liquid to the base of one set of tubes; a chamber in communication with the tops of both sets of tubes; means within the said chamber for effecting an even and simultaneous feed of liquid and of vapor emerging from the tops of the first stated set of tubes to the second set of tubes; means for distributing said liquid in a film over the inner surface of the second stated set of evaporating tubes; means including a chamber for separating said liquid and vapor discharged from the bottom of the second set of evaporating tubes; and means for removing both liquid and vapor separately, from the said evaporating chamber.

19. A vertical tube evaporator comprising two sets of substantially vertical evaporating tubes; means for heating such tubes; a chamber communicating with the tops of both sets of tubes and receiving partly concentrated liquid with its accompanying vapor from the ascending tubes and delivering such liquid and vapor to the descending tubes; means within said chamber for effecting an even and simultaneous feed of liquid and of vapor to the descending tubes, of the liquid and vapor escaping from said chamber; means for distributing such liquid in a film over the inner surface of the descending tubes and whirling the vapor or steam entering said tubes; means including a chamber for separating the liquid and vapor discharged from the descending tubes; and means for removing both liquid and vapor; separately, from said discharging chamber.

20. The combination in a tubular evaporator of a chamber for liquid to be evaporated; means for feeding vapor and liquid to the chamber; straight vertical fluid conducting means extending into the chamber and constructed to permit a lateral inflow of liquid and vapor from said chamber; a device for heating said fluid conducting means; and a chamber connected to receive the liquid from the conducting means after it has been concentrated; said conducting means constituting the sole connection between said two chambers.

In testimony whereof, I have signed my name to this specification, in the presence of two subscribing witnesses.

PAUL KESTNER.

Witnesses:
　HENRI CHARRIER,
　LÉON PECKEL.